United States Patent
Okada et al.

(10) Patent No.: US 11,421,732 B2
(45) Date of Patent: Aug. 23, 2022

(54) ROLLING COMPONENT, BEARING, AND METHOD OF MANUFACTURING THE SAME

(71) Applicant: NTN CORPORATION, Osaka (JP)

(72) Inventors: Takahiro Okada, Kuwana (JP); Takumi Fujita, Kuwana (JP); Naoya Kamura, Kuwana (JP); Yoshinori Sugisaki, Kuwana (JP)

(73) Assignee: NTN CORPORATION, Osaka (JP)

( * ) Notice: Subject to any disclaimer, the term of this patent is extended or adjusted under 35 U.S.C. 154(b) by 62 days.

(21) Appl. No.: 16/766,266

(22) PCT Filed: Nov. 21, 2018

(86) PCT No.: PCT/JP2018/042990
§ 371 (c)(1),
(2) Date: May 21, 2020

(87) PCT Pub. No.: WO2019/103039
PCT Pub. Date: May 31, 2019

(65) Prior Publication Data
US 2020/0362912 A1    Nov. 19, 2020

(30) Foreign Application Priority Data

Nov. 24, 2017 (JP) .............................. JP2017-226107
May 29, 2018 (JP) .............................. JP2018-102350

(51) Int. Cl.
| F16C 19/36 | (2006.01) |
| F16C 33/64 | (2006.01) |
| F16C 33/58 | (2006.01) |

(52) U.S. Cl.
CPC .............. F16C 19/36 (2013.01); F16C 33/58 (2013.01); F16C 33/64 (2013.01)

(58) Field of Classification Search
CPC ........ F16C 19/36; F16C 19/364; F16C 33/58; F16C 33/585; F16C 33/62; F16C 33/64
See application file for complete search history.

(56) References Cited

U.S. PATENT DOCUMENTS

| 5,259,886 A | 11/1993 | Utsumi et al. |
| 7,685,717 B2 * | 3/2010 | Shibata .................. F16C 33/64 |
| | | 29/898.066 |

(Continued)

FOREIGN PATENT DOCUMENTS

| CN | 1418292 A | 5/2003 |
| CN | 102574196 A | 7/2012 |

(Continued)

OTHER PUBLICATIONS

International Search Report issued in corresponding International Patent Application No. PCT/JP2018/042990, dated Feb. 12, 2019, with English translation.

(Continued)

*Primary Examiner* — James Pilkington
(74) *Attorney, Agent, or Firm* — McDermott Will & Emery LLP

(57) ABSTRACT

A rolling component has a surface. The rolling component includes a fiber flow. The surface has an Ra of 0.1 μm or less, an Rsk<0, and a compressive residual stress of 700 MPa or more. The surface and the fiber flow form an angle of 15° or more.

12 Claims, 15 Drawing Sheets

(56) References Cited

U.S. PATENT DOCUMENTS

| | | | |
|---|---|---|---|
| 2001/0033706 A1 | 10/2001 | Shimomura et al. | |
| 2003/0176152 A1 | 9/2003 | Lugt et al. | |
| 2004/0114843 A1 | 6/2004 | Shimomura et al. | |
| 2012/0210765 A1 | 8/2012 | Nakamizo et al. | |
| 2019/0309386 A1* | 10/2019 | Suzuki | F16C 19/36 |

FOREIGN PATENT DOCUMENTS

| | | | |
|---|---|---|---|
| JP | H03-271343 A | 12/1991 | |
| JP | 2002-181050 A | 6/2002 | |
| JP | 2004-263768 A | 9/2004 | |
| JP | 2011-67868 A | 4/2011 | |
| JP | 2013-116689 A | 6/2013 | |
| JP | 2016-151352 A | 8/2016 | |
| JP | 2017-062177 A | 3/2017 | |
| WO | 0171208 A1 | 9/2001 | |
| WO | WO2011024792 | * | 3/2011 |

OTHER PUBLICATIONS

Chinese Office Action issued in corresponding Chinese Patent Application No. 201880075117.2, dated Jul. 29, 2021, with English translation.

Indian Patent Office issued in corresponding Indian Patent Application No. 202037025560, dated Apr. 6, 2022, with English translation.

* cited by examiner

FIG.2
(A)
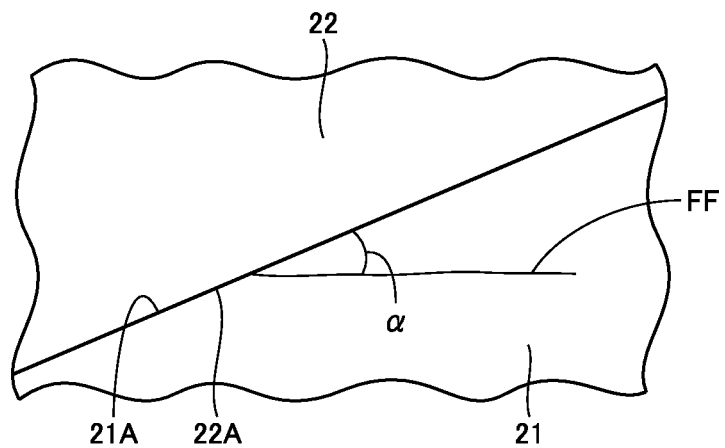
(B)
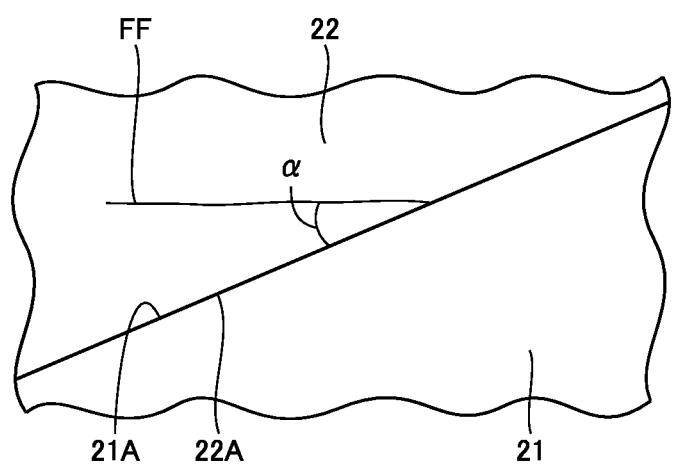

FIG.3
(A)
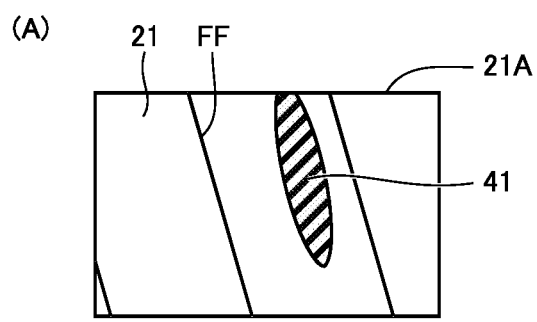
(B)
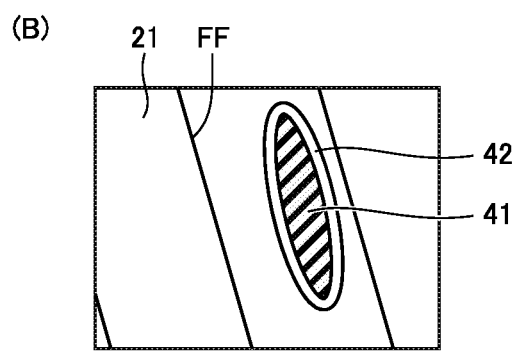

FIG.12
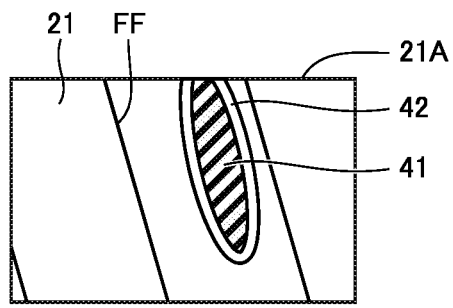
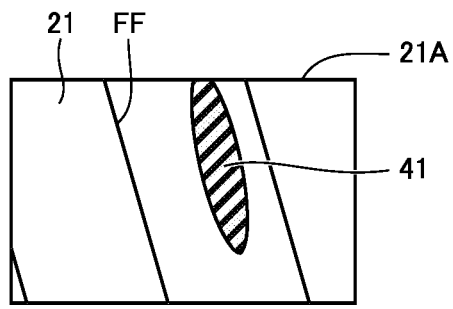

ROLLING COMPONENT, BEARING, AND METHOD OF MANUFACTURING THE SAME

CROSS REFERENCE TO RELATED APPLICATIONS

This patent application is the U.S. National Phase under 35 U.S.C. § 371 of International Application No. PCT/JP2018/042990, filed on Nov. 21, 2018, which claims the benefit of Japanese Patent Application No. 2018-102350, filed on May 29, 2018, and Japanese Patent Application No. 2017-226107, dated Nov. 24, 2017, the entire contents of each are hereby incorporated by reference in their entirety.

TECHNICAL FIELD

The present invention relates to a rolling component, a bearing, and a method of manufacturing the same, and particularly to a rolling component having a constituent member including a fiber flow, a bearing, and a method of manufacturing the same.

BACKGROUND ART

In order to increase the life of a bearing, it is required to reduce non-metallic inclusions from which flaking originates, in a rolling component forming the bearing, and to reduce the size of the inclusions. Steel manufacturers have therefore devised various steel making methods. It is impossible, however, to completely eliminate the non-metallic inclusions included in the rolling component. In addition, a steel material subjected to such a special process is expensive and not readily available in the global market.

As countermeasures against the non-metallic inclusions inevitably present in the rolling component, therefore, the following method is employed in Japanese Patent Laying-Open No. 2004-263768 (PTL 1), for example. In Japanese Patent Laying-Open No. 2004-263768, steel having a low degree of cleanliness and including non-metallic inclusions having a grain size of 30 µm or more is roller burnished. The non-metallic inclusions are thereby pulverized and reduced in grain size, so that a rolling component having a satisfactory rolling fatigue life is obtained.

From the viewpoint of improving the durability of a material forming a rolling component, attention may be paid to a fiber flow formed in the material. Japanese Patent Laying-Open No. 2013-116689 (PTL 2), for example, discloses a bearing device for a wheel in which an outer ring is cold rolled after being hot forged, so that a fiber flow in the outer ring is continuously formed along a contour shape without being cut. It is mentioned that the bearing device for a wheel thereby has improved durability.

CITATION LIST

Patent Literature

PTL 1: Japanese Patent Laying-Open No. 2004-263768
PTL 2: Japanese Patent Laying-Open No. 2013-116689

SUMMARY OF INVENTION

Technical Problem

A non-metallic inclusion is originally included in a surface of a raceway surface, in particular, of a rolling component, and is often exposed at the surface of the raceway surface to causes problems. This is because a gap is thereby formed between the non-metallic inclusion as the exposed portion, and a base material of the rolling component, and the gap acts as an open crack to cause premature failure of a bearing.

The non-metallic inclusion is also drawn along a fiber flow during rolling. If the fiber flow and the raceway surface form a large angle, therefore, the non-metallic inclusion is more likely to be exposed at the raceway surface. Although measures are thus taken to make the angle between the fiber flow and the raceway surface as small as possible, it is sometimes inevitable that this angle will increase after forging, depending on the shape of a product. Japanese Patent Laying-Open No. 2013-116689 fails to take adequate measures against the above-described problem.

The present invention has been made in view of the problem described above. An object of the present invention is to provide a rolling component in which a gap between a non-metallic inclusion exposed at a surface of a raceway surface and a base material is filled to thereby prevent the gap from acting as an open crack, a bearing including the rolling component, and a method of manufacturing the same.

Solution to Problem

A rolling component according to a first example of the present invention has a surface. The rolling component includes a fiber flow. The surface has an Ra of 0.1 µm or less, an Rsk<0, and a compressive residual stress of 700 MPa or more. The surface 21A and the fiber flow FF form an angle of 15° or more.

A rolling component according to a second example of the present invention has a surface. The rolling component includes a fiber flow. A gap between a non-metallic inclusion present on a side of the surface of the rolling component and a base material forming the rolling component is smaller than a gap between a non-metallic inclusion present on a side of an interior of the rolling component and the base material forming the rolling component. The surface 21A and the fiber flow FF form an angle of 15° or more.

A bearing according to the present invention includes an outer ring, a rolling element disposed on an inner circumferential surface of the outer ring, and an inner ring disposed at an inner circumferential side of the rolling element. At least one of the outer ring, the rolling element and the inner ring is the rolling component described above. The surface of the rolling component is one of a raceway surface of the outer ring, a raceway surface of the inner ring, and a rolling surface of the rolling element.

In a method of manufacturing the rolling component according to the first example of the present invention, a member having a surface to be worked and including a fiber flow is initially prepared. The surface to be worked is polished. After the polishing, the surface to be worked is plastically worked. The surface is formed to have an Ra of 0.1 µm or less, an Rsk<0, and a compressive residual stress of 700 MPa or more.

In a method of manufacturing the rolling component according to the second example of the present invention, a member having a surface to be worked and including a fiber flow is initially prepared. The surface to be worked is polished. After the polishing, the surface to be worked is plastically worked. A gap between a non-metallic inclusion present on a side of the surface of the rolling component and a base material forming the rolling component is formed to be smaller than a gap between a non-metallic inclusion present on a side of an interior of the rolling component and the base material forming the rolling component.

The present invention is a method of manufacturing a bearing including an outer ring, a rolling element disposed on an inner circumferential surface of the outer ring, and an inner ring disposed at an inner circumferential side of the rolling element. At least one of the outer ring, the rolling element and the inner ring is the rolling component described above. The surface of the rolling component is one of a raceway surface of the outer ring, a raceway surface of the inner ring, and a rolling surface of the rolling element.

Advantageous Effects of Invention

According to the present invention, a rolling component in which a gap between a non-metallic inclusion exposed at a surface of a raceway surface and a base material is filled to thereby prevent the gap from acting as an open crack can be obtained. In a manufacturing method, a gap can be filled by plastic working (burnishing) after polishing, to prevent the gap from acting as an open crack.

BRIEF DESCRIPTION OF DRAWINGS

FIG. 2(A) is a schematic enlarged cross-sectional view of a region A encircled with a dotted line in FIG. 1, and FIG. 2(B) is a schematic enlarged cross-sectional view of region A encircled with the dotted line in FIG. 1.

FIG. 3(A) is a schematic cross-sectional view showing an example of a non-metallic inclusion disposed to be exposed at a surface of a base material of a rolling component, and FIG. 3(B) is a schematic cross-sectional view showing an example of a non-metallic inclusion in the interior away from the surface of the base material of the rolling component.

FIG. 12(A) is a schematic cross-sectional view showing a manner before an inner ring raceway surface at which a gap between the non-metallic inclusion and the base material is exposed is plastically worked, and FIG. 12(B) is a schematic cross-sectional view showing a manner after the inner ring raceway surface at which the gap between the non-metallic inclusion and the base material is exposed is plastically worked.

DESCRIPTION OF EMBODIMENTS

The present embodiment will be described below with reference to the drawings. A rolling bearing formed in the present embodiment is initially described using FIGS. 1 and 2.

Figure 1:
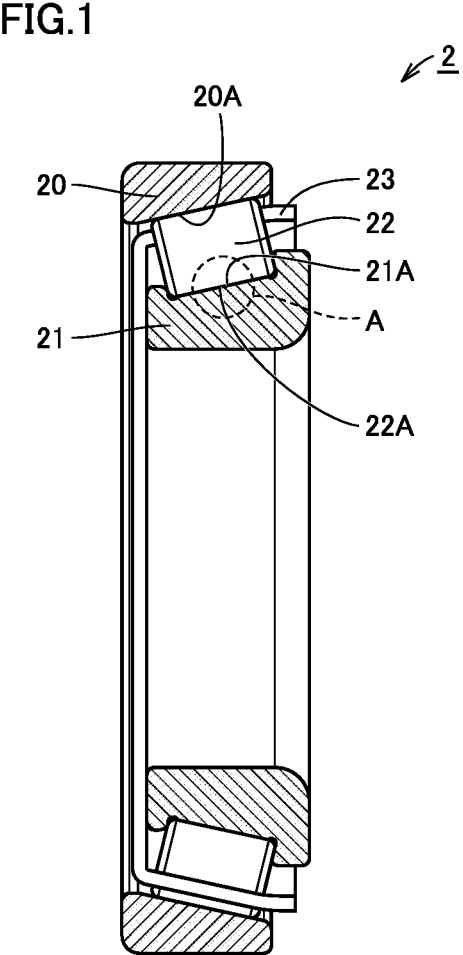
FIG. 1 is a schematic cross-sectional view showing the structure of a tapered roller bearing according to the present embodiment.

FIG. 1 is a schematic cross-sectional view showing the structure of a tapered roller bearing according to the present embodiment. FIG. 2 shows a first example (A) and a second example (B) of a schematic enlarged cross-sectional view of a region A encircled with a dotted line in FIG. 1. Referring to FIG. 1, a tapered roller bearing 2 as a bearing formed in the present embodiment mainly includes an outer ring 20, an inner ring 21, a plurality of rollers 22, and a cage 23. Outer ring 20 has an annular shape, and has an outer ring raceway surface 20A at its inner circumferential surface. Inner ring 21 has an annular shape, and has an inner ring raceway surface 21A at its outer circumferential surface. Inner ring 21 is disposed at the inner circumferential side of outer ring 20 such that inner ring raceway surface 21A faces outer ring raceway surface 20A.

Rollers 22 as rolling elements are disposed on the inner circumferential surface of outer ring 20. Rollers 22 each have a roller rolling surface 22A, each come into contact, at roller rolling surface 22A, with inner ring raceway surface 21A and outer ring raceway surface 20A, and are circumferentially disposed at a prescribed pitch by cage 23. Rollers 22 are thereby held in a freely rolling manner on the annular raceway of each of outer ring 20 and inner ring 21. Put conversely, above-described inner ring 21 is disposed at the inner circumferential side of rollers 22. Tapered roller bearing 2 is also configured such that the vertex of a cone including outer ring raceway surface 20A, the vertex of a cone including inner ring raceway surface 21A, and the vertex of a cone including a track of the rotation axis obtained in accordance with rolling of roller 22 intersect one another at one point on the center line of the bearing. By such configuration, outer ring 20 and inner ring 21 of tapered roller bearing 2 are rotatable relative to each other.

As described above, tapered roller bearing 2 includes outer ring 20, inner ring 21 and rollers 22, as rolling components. In other words, at least one of outer ring 20, inner ring 21 and rollers 22 is the rolling component described above. Referring to FIG. 2(A), inner ring raceway surface 21A of inner ring 21 and roller rolling surface 22A of roller 22 come into contact with each other, for example. As with these inner ring raceway surface 21A and roller rolling surface 22A, each rolling component has a surface that comes into contact with another rolling component. Although not shown in FIG. 2, outer ring raceway surface 20A of outer ring 20 and roller rolling surface 22A of roller 22 also come into contact with each other. That is, outer ring 20 which is a rolling component also has a surface that comes into contact with roller 22 which is another rolling component.

As shown in FIG. 2(A), inner ring 21, for example, which is a rolling component, includes a fiber flow FF in its structure. An angle α formed between inner ring raceway surface 21A which is the surface of inner ring 21 and fiber flow FF included in inner ring 21 is 15° or more.

Referring to FIG. 2(B), fiber flow FF may be included on the side of roller 22. Also in this case, angle α formed between roller rolling surface 22A which is the surface of roller 22 and fiber flow FF included in roller 22 is 15° or more.

The surface of the rolling component is one of outer ring raceway surface 20A as a raceway surface of outer ring 20, inner ring raceway surface 21A as a raceway surface of inner ring 21, and roller rolling surface 22A as a rolling surface of roller 22. That is, the surface of each of inner ring raceway surface 21A, outer ring raceway surface 20A and roller rolling surface 22A has an arithmetic mean roughness Ra of 0.1 μm or less, and an Rsk<0. This surface also has a compressive residual stress of 700 MPa or more.

FIG. 3 shows schematic cross-sectional views showing a gap between a base material of the rolling component and a non-metallic inclusion present in the base material. In particular, FIG. 3(A) shows an example of the non-metallic inclusion disposed to be exposed at a surface of the base material, and FIG. 3(B) shows an example of the non-metallic inclusion in the interior away from the surface of the base material. Referring to FIGS. 3(A) and 3(B), in the rolling component such as inner ring 21, a gap 42 between a non-metallic inclusion 41 present on the side of the surface (upper side in FIG. 3(A)) of inner ring raceway surface 21A and the like and the base material forming inner ring 21 is smaller than a gap 42 between a non-metallic inclusion 41 present on the side of the interior away from inner ring raceway surface 21A of inner ring 21 and the base material forming inner ring 21. This is also the case with outer ring 20 and rollers 22 which are rolling components. A shown in FIG. 3(A), no gap may be present at all between non-metallic inclusion 41 on the side of the surface of inner ring raceway surface 21A and the like and the base material.

A material forming outer ring 20, inner ring 21 and rollers 22 may be steel. This steel is of course mainly composed of iron (Fe), and may include inevitable impurities in addition to the above-described element. Examples of the inevitable impurities include phosphorus (P), sulfur (S), nitrogen (N), oxygen (O), and aluminum (Al). The amount of each of these inevitable impurity elements is not higher than 0.1 mass %. As a result, outer ring 20, inner ring 21 and rollers 22 may be made of a steel material having an oxygen content of 5 ppm or more, for example.

This steel is, for example, S53C defined by JIS standards, which is an example material for a bearing. S53C contains not lower than 0.5 mass % and not higher than 0.56 mass % of carbon, contains not lower than 0.15 mass % and not higher than 0.35 mass % of silicon, and contains not lower than 0.6 mass % and not higher than 0.9 mass % of manganese. S53C also contains not higher than 0.03 mass % of phosphorus, not higher than 0.035 mass % of sulfur, not higher than 0.2 mass % of chromium, and not higher than 0.02 mass % of nickel.

A method of manufacturing the rolling components having the configurations described above, and tapered roller bearing 2 including the rolling components is now described using FIGS. 4 to 9. That is, described below is a method of manufacturing tapered roller bearing 2 including outer ring 20, rollers 22 disposed on the inner circumferential surface of outer ring 20, and inner ring 21 disposed at the inner circumferential side of rollers 22. Note that FIGS. 4 to 9 below show a process of manufacturing inner ring 21 as an example.

Figure 4:
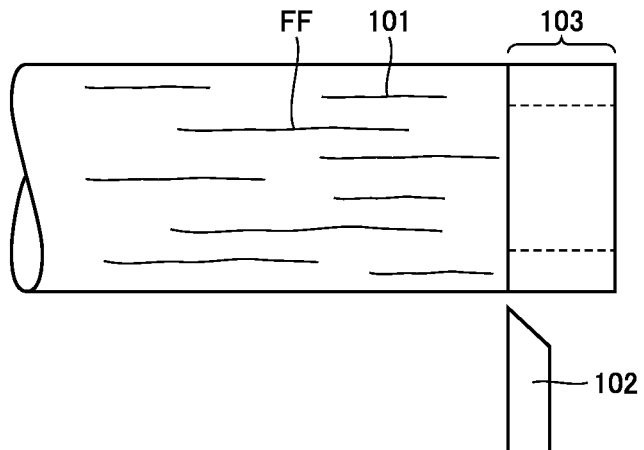
FIG. 4 is a schematic cross-sectional view showing a first step of a method of manufacturing the tapered roller bearing of the present embodiment.
Figure 5:
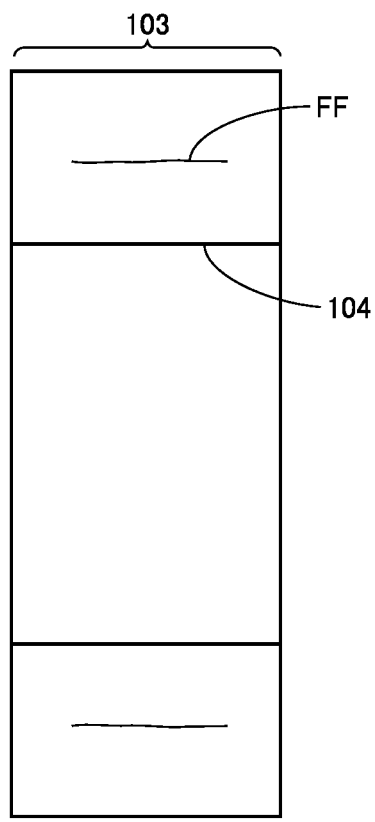
FIG. 5 is a schematic cross-sectional view showing a second step of the method of manufacturing the tapered roller bearing of the present embodiment.

Referring to FIG. 4, a steel material 101 for forming one of outer ring 20, inner ring 21 and rollers 22 which are rolling components is initially prepared. Steel material 101 includes materials as described above. Steel material 101 includes fiber flow FF extending horizontally in the figure, for example. A rolling component formation region 103 is cut from steel material 101 by a cutting tool 102. Referring to FIG. 5, a member having a cavity 104 in its center is formed for forming inner ring 21.

Figure 6:
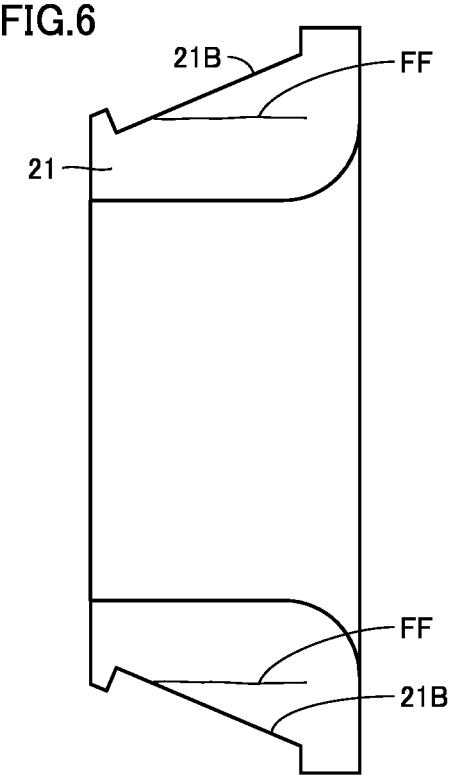
FIG. 6 is a schematic cross-sectional view showing a third step of the method of manufacturing the tapered roller bearing of the present embodiment.

Referring to FIG. 6, the outer circumferential surface of inner ring 21 is subjected to working such as commonly known grinding, and heat treatment such as quenching. A member is thereby formed, which includes fiber flow FF as shown in the figure, and has an outer circumferential surface tilted with respect to a direction in which fiber flow FF extends, that is, a surface to be worked 21B. Surface to be worked 21B is formed to form an angle of 15° or more with fiber flow FF.

Figure 7:
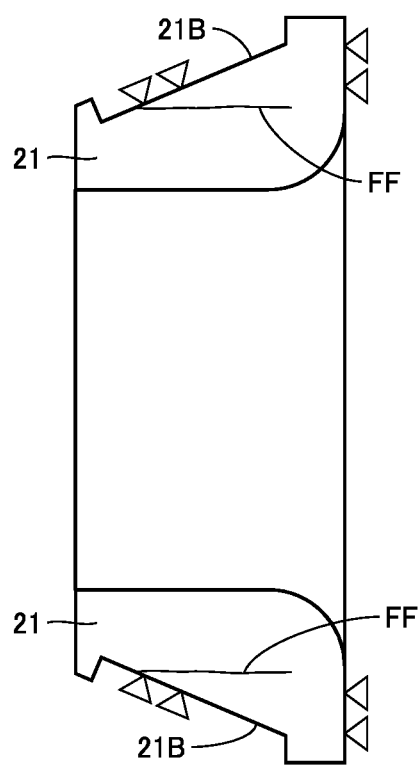
FIG. 7 is a schematic cross-sectional view showing a fourth step of the method of manufacturing the tapered roller bearing of the present embodiment.

Referring to FIG. 7, surface to be worked 21B of inner ring 21 is polished. The polishing is preferably performed with an inner ring grinder, for example. Surface to be worked 21B of inner ring 21 is thereby polished to have an arithmetic mean roughness Ra of 0.1 μm or less.

After the polishing step in FIG. 7, surface to be worked 21B is plastically worked. Surface to be worked 21B thereby serves as inner ring raceway surface 21A.

Figure 8:
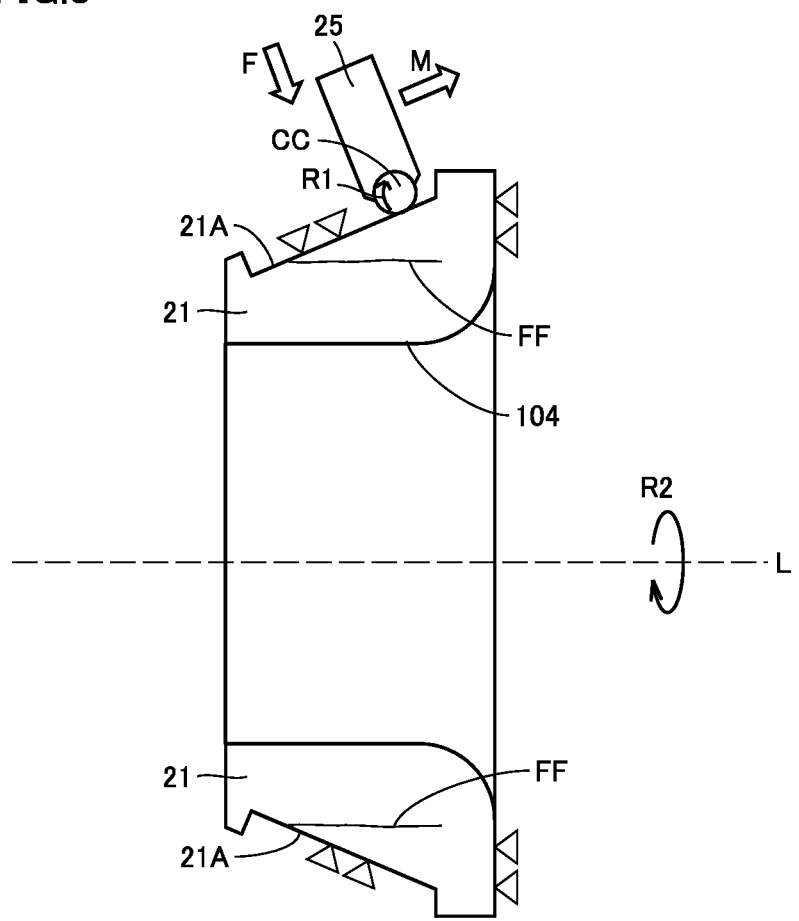
FIG. 8 is a schematic cross-sectional view showing a first example of a fifth step of the method of manufacturing the tapered roller bearing of the present embodiment.

FIG. 8 shows a first example of the above-described plastic working. Referring to FIG. 8, it is preferable that burnishing be performed in the plastically working step. In the burnishing, a pressing portion CC, such as a hard ball made of ceramics, or a protruding shape portion made of diamond, is used as a tool. FIG. 8 illustrates pressing portion CC having a spherical shape as an example. Pressing portion CC presses surface to be worked 21B with a force indicated by an arrow F, while pressing portion CC is rotated in a direction of an arrow R1 in the figure, and inner ring 21 is rotated in a circumferential direction of an arrow R2 around an imaginary axis L extending through cavity 104. This pressing is performed such that a burnishing tool 25 having pressing portion CC mounted thereon applies the force of arrow F to pressing portion CC. Burnishing tool 25 also transports pressing portion CC on surface to be worked 21B such that pressing portion CC moves in a direction of an arrow M. Micro irregularities and the like present on surface to be worked 21B are thereby flattened.

Figure 9:
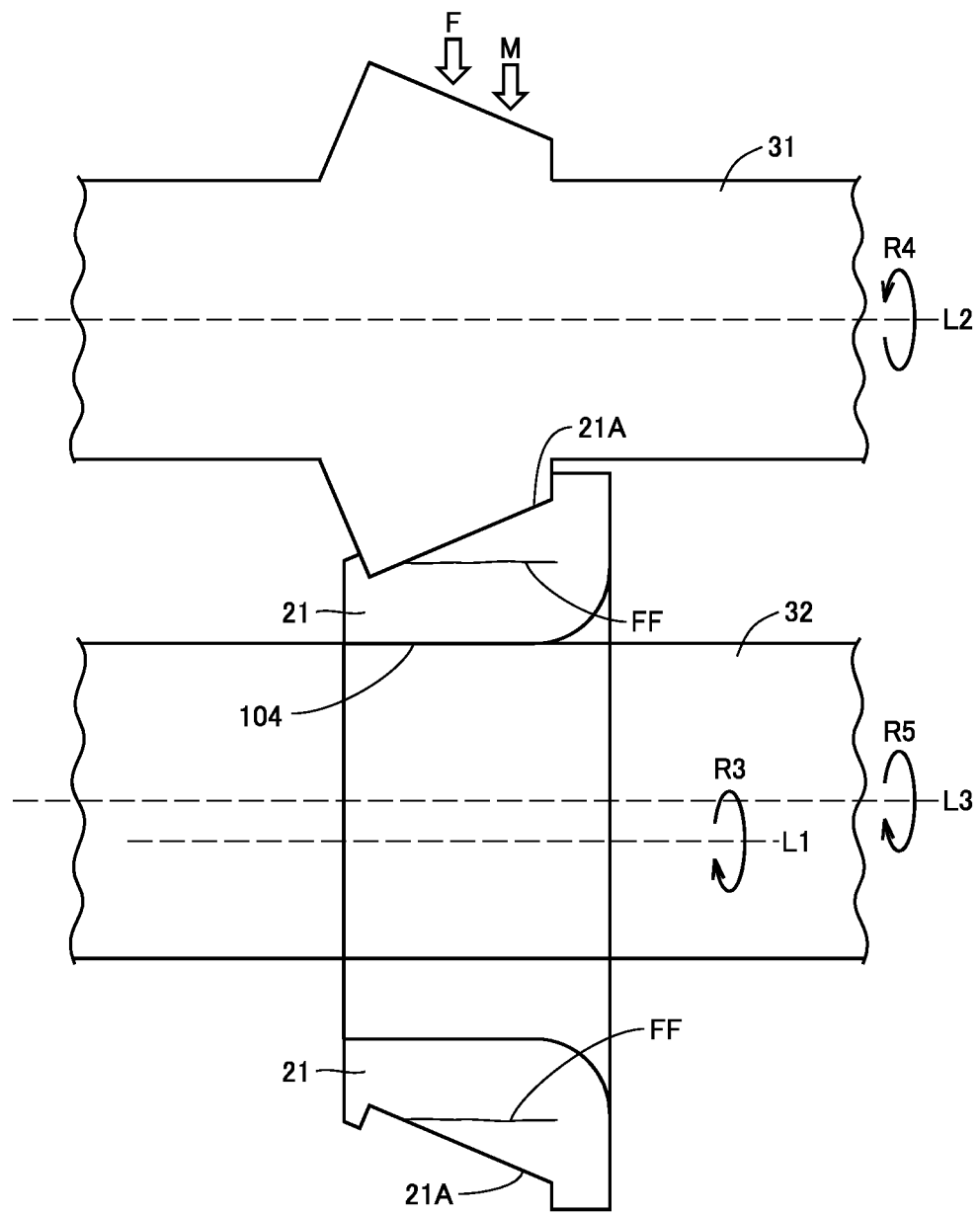
FIG. 9 is a schematic cross-sectional view showing a second example of the fifth step of the method of manufacturing the tapered roller bearing of the present embodiment.

FIG. 9 shows a second example of the above-described plastic working. Referring to FIG. 9, cold rolling may be performed, for example, in the plastically working step. A forming roll 31 and a mandrel 32 are prepared in the cold rolling. Each of forming roll 31 and mandrel 32 has a circular cross section intersecting an axial direction (horizontal direction in FIG. 9) and is in the form of a rod in its entirety, for example. As shown in FIG. 9, however, forming roll 31 is pressed, with a part of its outer circumferential surface, against surface to be worked 21B which will serve as a tilted inner ring raceway surface 21B for inner ring 21 of tapered roller bearing 2. Thus, a part of the outer circumferential surface of forming roll 31 may partially have a conical shape tilted with respect to its axial direction.

Forming roll 31 is pressed against surface to be worked 21B with a force of an arrow F from outside of inner ring 21, and mandrel 32 is pressed against an inner wall surface of cavity 104 from inside of inner ring 21. That is, a steel material portion of inner ring 21 is disposed so as to be sandwiched between forming roll 31 and mandrel 32. Inner ring 21 is rotated in this state in a circumferential direction of an arrow R3 around an imaginary axis L1 extending through cavity 104. At the same time, forming roll 31 is rotated in a direction of an arrow R4 around an imaginary axis L2 extending through the center of a cross section with respect to its axial direction, and mandrel 32 is rotated in a direction of an arrow R5 around an imaginary axis L3 extending through the center of a cross section with respect to its axial direction. Here, it is preferable that rotation direction R3 of inner ring 21 be the same as rotation direction R5 of mandrel 32, but rotation direction R4 of forming roll 31 be opposite to above-described rotation directions R3 and R5. Forming roll 31 moves, while rotating, in a direction indicated by an arrow M toward inner ring 21. Mandrel 32, however, does not move like forming roll 31, although it rotates. The micro irregularities and the like present on surface to be worked 21B are flattened by the rotation and movement described above, and inner ring raceway surface 21A is formed.

In a manner described above, inner ring 21 having plastically worked inner ring raceway surface 21A is formed. The surface of inner ring raceway surface 21A after the plastic working has an Ra<0.1 μm, an Rsk<0, and a compressive residual stress of 700 MPa or more. In addition, gap 42 between non-metallic inclusion 41 present on the side of the surface of inner ring raceway surface 21A after the plastic working (see FIG. 3(A)) and the base material forming inner ring 21 is formed to be smaller than gap 42 between non-metallic inclusion 41 present on the side of the interior away from inner ring raceway surface 21A of inner ring 21 and the base material forming inner ring 21. The surface of inner ring raceway surface 21A forms an angle of 15° or more with fiber flow FF.

While the process of manufacturing inner ring 21 has been described above as an example, outer ring 20 is also formed basically in a similar manufacturing process to that of inner ring 21. Rollers 22 differ greatly in formed shape from outer ring 20 and inner ring 21. However, rollers 22 are also similar to the other rolling components in that rolling component formation region 103 is cut from steel material 101, and that surface to be worked 21B is polished and then plastically worked.

Thereafter, the rolling components formed in the above-described steps are assembled, to form tapered roller bearing 2 having the configuration as shown in the cross-sectional view of FIG. 1, for example.

The background of the present embodiment is now described, and then functions and effects, other preferable configurations and the like of the present embodiment will be described.

Figure 10:
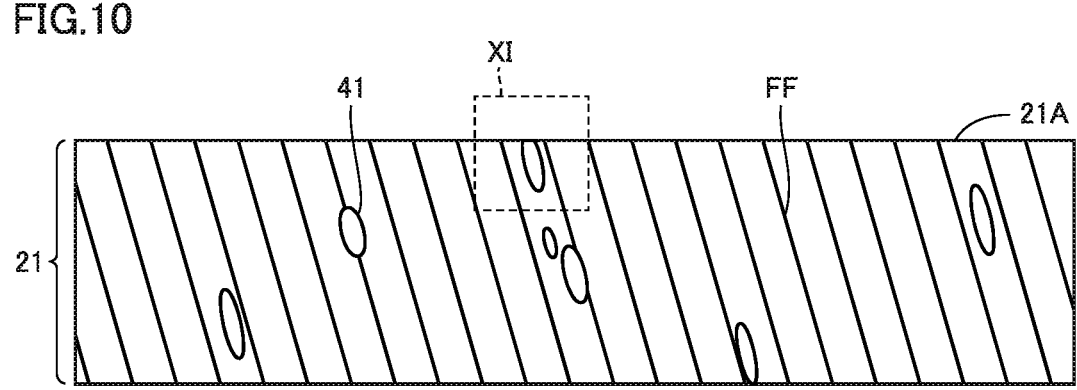
FIG. 10 is a schematic cross-sectional view showing a manner in which non-metallic inclusions are present inside an inner ring.
Figure 11:
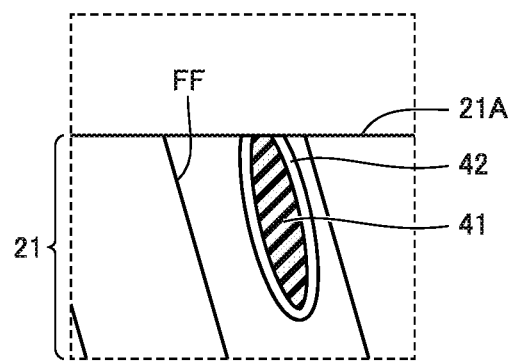
FIG. 11 is a schematic enlarged cross-sectional view of a region XI encircled with a dotted line in FIG. 10.

FIG. 10 is a schematic cross-sectional view showing a manner in which the non-metallic inclusions are present inside the rolling component, for example, inner ring 21. FIG. 11 is a schematic enlarged cross-sectional view of a region XI encircled with a dotted line in FIG. 10. Referring to FIGS. 10 and 11, when the following two conditions are satisfied in the rolling component such as inner ring 21, non-metallic inclusion 41 included in the rolling component is more likely to be exposed at inner ring raceway surface 21A and the like. One of the conditions is that the steel material which is the base material forming the rolling component has a low degree of cleanliness. The other condition is that inner ring raceway surface 21A and the like and fiber flow FF form a large angle. Non-metallic inclusion 41 exposed at inner ring raceway surface 21A and the like generates an open crack originating from gap 42 between non-metallic inclusion 41 and the base material, causing premature failure of a bearing including this rolling component. Gap 42 is also exposed at inner ring raceway surface 21A, causing a lubricant to enter this gap 42 during use of the bearing. When rollers 22 and the like roll over gap 42 in this state, gap 42 widens due to oil pressure. This causes extension of the crack originating from gap 42. Although it is ideal to use a steel having a high degree of cleanliness in order to prevent the exposure of non-metallic inclusion 41 at inner ring raceway surface 21A and the like, such steel is expensive and is procured only with difficulty. Although it is ideal to make the angle formed between inner ring raceway surface 21A and the like and fiber flow FF as small as possible, it is sometimes inevitable that this angle will increase, depending on the shape of a product.

In the present embodiment, therefore, as shown in FIGS. 12(A) and 12(B), such surface to be worked is polished, and then plastically worked such as being burnished or cold rolled. Note that FIGS. 12(A) and 12(B) show a manner (A) before inner ring raceway surface 21A at which gap 42 between non-metallic inclusion 41 and the base material is exposed is plastically worked, and a manner (B) after the surface is plastically worked. As a result, the surface of inner ring raceway surface 21A and the like has an Ra of 0.1 μm or less, an Rsk<0, and a compressive residual stress of 700 MPa or more. The gap between the non-metallic inclusion exposed at the surface of the raceway surface and its surrounding base material is thereby narrowed, or disappears by being filled and closed.

That is, particularly, as shown in FIGS. 3 and 12, by the plastic working, gap 42 between non-metallic inclusion 41 on the side of the surface of inner ring raceway surface 21A and the like and the base material becomes smaller than gap 42 between non-metallic inclusion 41 on the side of the interior of the rolling component and the base material. Therefore, the cause of premature failure of the rolling component due to a crack is reduced (or eliminated). The extension of the crack originating from gap 42 between non-metallic inclusion 41 at inner ring raceway surface 21A and the base material can thereby be suppressed, to increase the life of the bearing.

When working is performed under generally satisfactory operating conditions, a satisfactory lubrication state can be obtained if each parameter of the surface of inner ring raceway surface 21A and the like in a finished product is in a numerical range of an Ra of 0.1 μm or less and an Rsk<0. In addition, the extension of the crack can be suppressed by setting the compressive residual stress to 700 MPa or more.

Note that in the plastically working step described above, one selected from the group consisting of shot peening, a water jet, and ultrasonic impact treatment (UIT) may be employed instead of the burnishing. Also in this case, functions and effects similar to those produced in the case of burnishing are produced.

From the viewpoint of suppressing flaking caused by an open crack, it is considered preferable that the angle formed between fiber flow FF and the raceway surface or the rolling surface be 15° or less as described above. From the viewpoint of using a clean steel material, it is considered preferable that the rolling component have an oxygen content of 5 ppm or less. In the present embodiment, however, even if the above-described angle is 15° or more, the occurrence of flaking caused by an open crack can be suppressed by the above-described plastic working, to increase the life of the bearing. Furthermore, in the present embodiment, even if outer ring 20, inner ring 21 and rollers 22 as rolling components each have an oxygen content of 5 ppm or more, the occurrence of flaking caused by an open crack can be suppressed by the above-described plastic working, to increase the life of the bearing.

Figure 13:
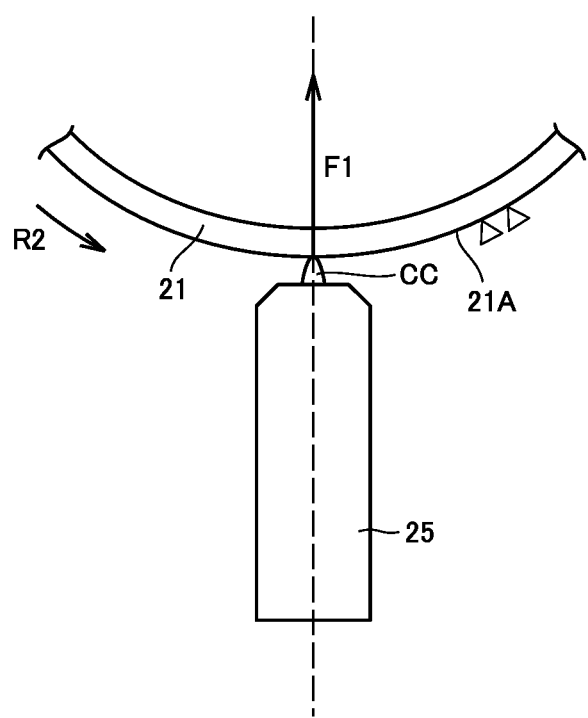
FIG. 13 is a schematic diagram showing a manner in which, during burnishing, a burnishing tool applies pressure so as to press a surface to be worked for forming the inner ring raceway surface and the like, in a direction perpendicular to the surface to be worked.
Figure 14:
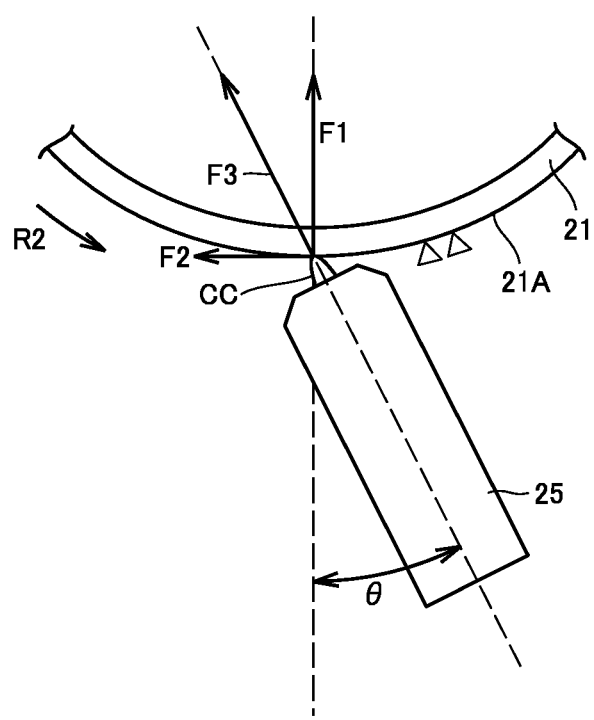
FIG. 14 is a schematic diagram showing a manner in which, during burnishing, the burnishing tool applies pressure so as to press the surface to be worked for forming the inner ring raceway surface and the like, in a direction oblique to the direction perpendicular to the surface to be worked.

In order to enhance the effect of filling the gap between the non-metallic inclusion and the base material by the plastic working through burnishing as described above, it is preferable that the following be performed. FIG. 13 shows a manner in which, when burnishing inner ring 21 rotated in a direction of an arrow R2, burnishing tool 25 applies pressure so as to press surface to be worked 21B and the like for forming inner ring raceway surface 21A, in a direction perpendicular to surface to be worked 21B and the like. FIG. 14 shows a manner in which, when burnishing inner ring 21 rotated in the direction of arrow R2, burnishing tool 25 applies pressure so as to press surface to be worked 21B and the like for forming inner ring raceway surface 21A, in a direction oblique to the direction perpendicular to surface to be worked 21B and the like. Referring to FIG. 13, during the burnishing, for example, burnishing tool 25 may press surface to be worked 21B with a perpendicular force F1 in the direction perpendicular to surface to be worked 21B, as in FIG. 8. However, referring to FIG. 14, in the present embodiment, during the burnishing, it is preferable that burnishing tool 25 press surface to be worked 21B in the direction oblique to the direction perpendicular to surface to be worked 21B. That is, in this case, pressing portion CC, which is a tool as a protruding shape portion made of diamond and mounted on burnishing tool 25, plastically works surface to be worked 21B while pressing the surface with a pressing force F3 in a direction having a tilt angle θ with respect to the direction perpendicular to surface to be worked 21B, to form inner ring raceway surface 21A. Pressing force F3 that presses surface to be worked 21B can be resolved into perpendicular force F1 applied in the direction perpendicular to surface to be worked 21B, and a tangential force F2 applied along a direction intersecting perpendicular force F1, that is, the horizontal direction in FIG. 14. Thus, stated from a different perspective, it is preferable that, as shown in FIG. 14, the burnishing be performed by application of a resultant force (pressing force F3) of perpendicular force F1 applied in the direction perpendicular to surface to be worked 21B and tangential force F2 applied in the direction intersecting perpendicular force F1.

Figure 15:
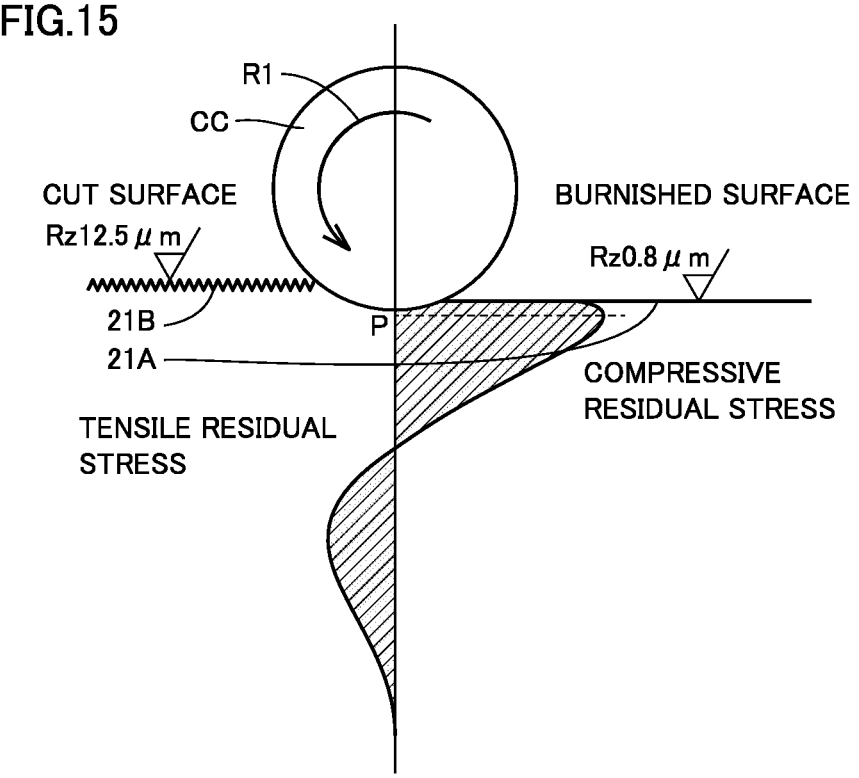
FIG. 15 is a schematic diagram showing an example of surface roughness before and after the burnishing, and distribution of residual stresses during the burnishing.

FIG. 15 is a schematic diagram showing distribution of residual stresses in a depth direction of inner ring 21 during the burnishing. In FIG. 15, a curve below pressing portion CC indicates relation between the depth from the surface to be worked (ordinate), and compressive residual stress (coordinate on the right side of the center) and tensile residual stress (coordinate on the left side of the center). Referring to FIG. 15, pressing portion CC as a burnishing tool plastically works surface to be worked 21B for forming inner ring raceway surface 21A and the like. Surface to be worked 21B before the plastic working has a maximum height roughness Rz of 12.5 µm, and inner ring raceway surface 21A after the plastic working has a maximum height roughness Rz of 0.8 µm. Surface to be worked 21B deforms by the plastic working as shown in FIG. 15, leading to filling of the gap between the base material and the non-metallic inclusion. In order to enhance the effect of filling the gap, it is preferable that control be performed such that a position P, where the compressive residual stress applied to the base material by the plastic working shown in FIG. 15 reaches its maximum stress, is located closer to the surface (upper side in FIG. 15). Such control can be implemented by providing the angle θ described above.

In other words, the direction in which the pressure is applied is tilted with respect to surface to be worked 21B during the burnishing, so that the resultant force of both perpendicular force F1 and tangential force F2 is applied. The position where the amount of plastic deformation and the amount of compressive residual stress reach their maximum amounts can thereby be shifted closer to the surface, that is, a shallower position from the surface to be worked. This leads to filling the gap between the non-metallic inclusion and the base material, to enhance the adhesion between the inclusion at the base material surface and the base material. Therefore, the effect of suppressing the extension of the crack originating from the gap can be enhanced.

Figure 16:
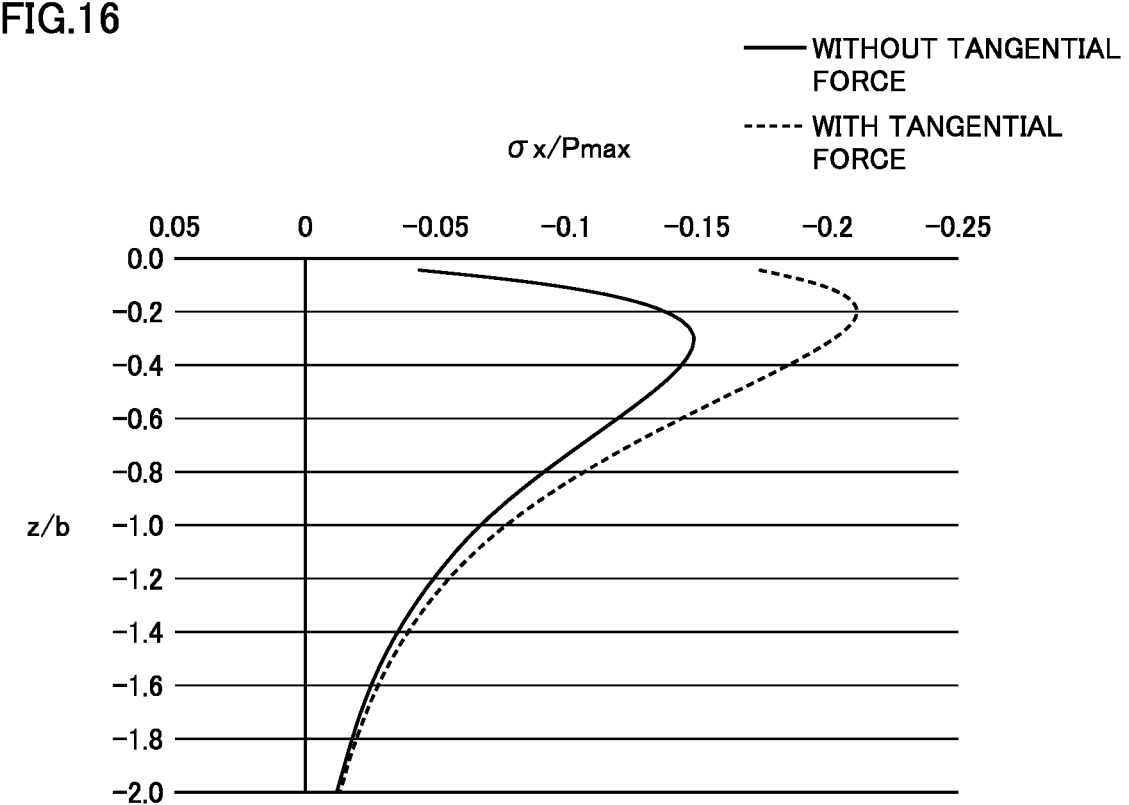
FIG. 16 is a graph indicating that the effect of suppressing an open crack can be enhanced by applying a pressing force in the oblique direction during the burnishing.

A graph of FIG. 16 represents $\sigma x/P_{max}$ on the horizontal axis, and $z/b$ on the vertical axis. Here, $\sigma x$ represents circumferential stress during the burnishing, and $P_{max}$ represents a maximum contact pressure of inner ring raceway surface 21A and the like during the burnishing. In addition, z represents a position coordinate in a depth direction of inner ring raceway surface 21A and the like to be burnished, and b represents the radius of the minor axis of an ellipse where a workpiece such as inner ring raceway surface 21A comes into contact with burnishing tool 25 and the like. That is, the graph of FIG. 16 shows relation between the depth from the surface of inner ring raceway surface 21A and the like, and stress distribution in the direction of tangential force F2, during the burnishing.

Referring to FIG. 16, the stress distribution varies by application of tangential force F2 to the workpiece during the burnishing. Thus, $\sigma x/P_{max}$ has a distribution with a peak closer to the surface to be worked when tangential force F2 is applied to the workpiece during the burnishing (with tangential force) than when tangential force F2 is not applied and only perpendicular force F1 is applied (without tangential force). A peak position of the residual stress is also closer to the surface when tangential force F2 is applied to the workpiece during the burnishing (with tangential force) than when tangential force F2 is not applied and only perpendicular force F1 is applied (without tangential force). Thus, by applying tangential force F2 to the workpiece during the burnishing, the gap between the inclusion at inner ring raceway surface 21A and the base material can be efficiently filled.

Example 1

Figure 17:
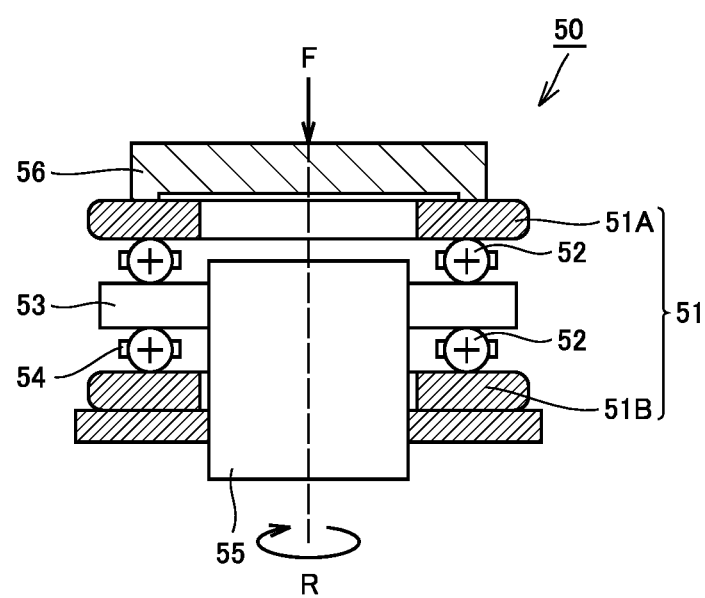
FIG. 17 is a schematic cross-sectional view showing the configuration of a rolling fatigue test machine that was used for a rolling fatigue test in Example 1.

In order to confirm the effect of burnishing, a rolling fatigue test was conducted on a test specimen as an outer ring or an inner ring in the form of a flat plate. FIG. 17 is a schematic diagram showing the configuration of a rolling fatigue test machine that was used for the rolling fatigue test in Example 1. Referring to FIG. 17, rolling fatigue test machine 50 is a device for measuring the rolling fatigue lives of two test specimens 51, that is, a test specimen 51A and a test specimen 51B. Test specimens 51A and 51B are each an annular member having the same shape as an outer ring or an inner ring of a bearing. A ring-shaped surface of each of test specimens 51A and 51B faces a turntable 53 with steel balls 52 interposed therebetween. Steel balls 52 are in contact with surfaces of test specimen 51A and of turntable 53 facing each other.

Although not shown, turntable 53 has an annular shape with a raceway groove in both surfaces thereof, and the plurality of steel balls 52 are disposed such that they are spaced a constant angle (for example, 24°) apart, at a position overlapping this annular shape in plan view. Steel balls 52 are determined in position relative to one another by a cage 54. The plurality of steel balls 52 are thereby collectively configured such that they are integrated with single cage 54. A member composed of steel balls 52 and cage 54 is disposed both above and below turntable 53. Test specimen 51A is disposed over steel balls 52 above turntable 53, and test specimen 51B is disposed under steel balls 52 below turntable 53.

A rotation shaft 55 is mounted on the inner side of the annular shape of turntable 53 in plan view. Rotation shaft 55 rotates in a direction indicated by an arrow R in the figure. Turntable 53 mounted on rotation shaft 55 thereby rotates around rotation shaft 55. A rotating force of turntable 53 is transmitted to steel balls 52 as well. Test specimens 51A and 51B are subjected to a load from a load table 56 above indicated by an arrow F in the figure.

Note that the size of each member of rolling fatigue test machine 50 and conditions for the rolling fatigue test were as shown in Table 1 below:

TABLE 1

| | |
|---|---|
| Shape of Test Specimen | ϕ62 × t6 Flat Plate |
| Counterpart Material | Fifteen ⅜ Steel Balls |
| Maximum Contact Pressure | Pmax = 4.2 GPa |
| Load Rate | 11250 cpm (1500 rpm) |
| Lubrication | Additive-Free Turbine VG46 250 ml/min |
| Test Temperature | 40° C. |
| Number of Specimens for Test | 30 |

Figure 18:
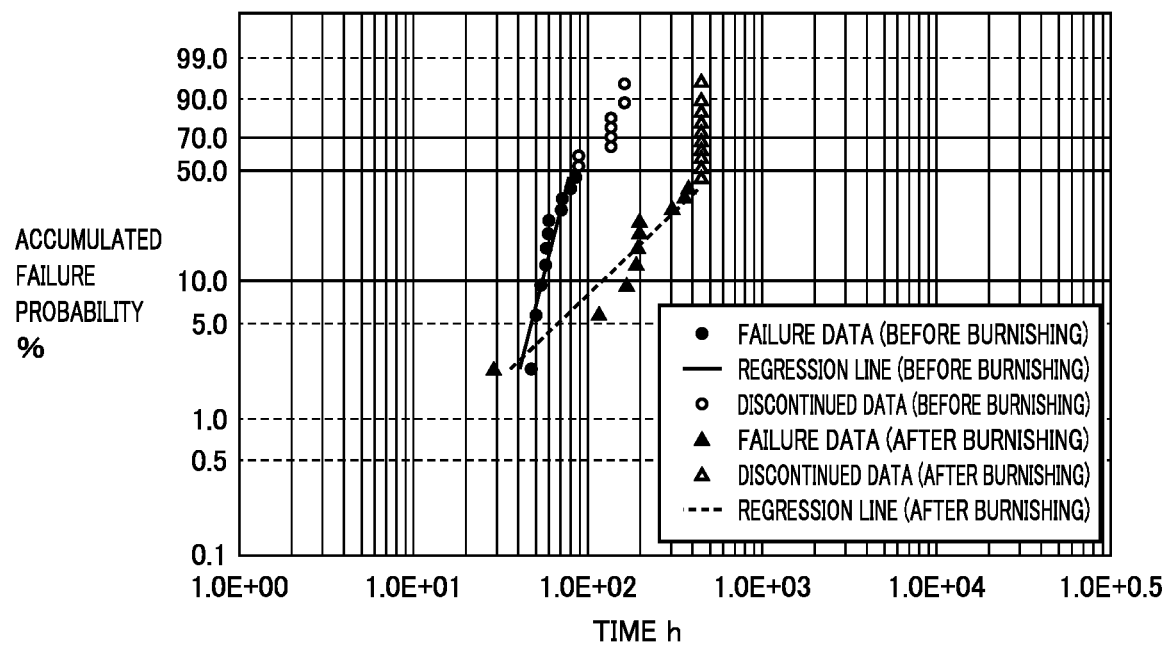
FIG. 18 is a graph showing results of the rolling fatigue test in Example 1.

Under the conditions of Table 1, tests were conducted using samples of test specimen 51 that has been burnished (with burnishing) and test specimen 51 that has not been burnished (without burnishing), to measure a period of time until the occurrence of flaking of its surface, or to record a period of time until the discontinuation of the test because the test specimen did not fail. The results are shown in Table 2 below and a graph of FIG. 18. Note that FIG. 18 represents a period of time until the occurrence of failure of test specimen 51 in Example 1 on the horizontal axis, and an accumulated failure probability after an elapse of each period of time on the vertical axis. FIG. 18 shows a Weibull plot of the rolling fatigue life of each test specimen by the rolling fatigue test.

TABLE 2

| | Without Burnishing | | With Burnishing | |
|---|---|---|---|---|
| Sample No. | Operating Time (h) | Post-Test State | Operating Time (h) | Post-Test State |
| 1 | 59.3 | Discontinued | 382.3 | Discontinued |
| 2 | 59.3 | Flaking | 382.3 | Flaking |
| 3 | 57.5 | Flaking | 191.8 | Flaking |
| 4 | 57.5 | Discontinued | 191.8 | Discontinued |

TABLE 2-continued

| | Without Burnishing | | With Burnishing | |
|---|---|---|---|---|
| Sample No. | Operating Time (h) | Post-Test State | Operating Time (h) | Post-Test State |
| 5 | 71.1 | Discontinued | 450.0 | Discontinued |
| 6 | 71.1 | Flaking | 450.0 | Discontinued |
| 7 | 136.3 | Discontinued | 450.0 | Discontinued |
| 8 | 136.3 | Discontinued | 450.0 | Discontinued |
| 9 | 47.2 | Discontinued | 450.0 | Discontinued |
| 10 | 47.2 | Flaking | 450.0 | Discontinued |
| 11 | 85.7 | Discontinued | 197.8 | Discontinued |
| 12 | 85.7 | Flaking | 197.8 | Flaking |
| 13 | 162.5 | Discontinued | 450.0 | Discontinued |
| 14 | 162.5 | Discontinued | 450.0 | Discontinued |
| 15 | 89.2 | Discontinued | 308.0 | Discontinued |
| 16 | 89.2 | Discontinued | 308.0 | Flaking |
| 17 | 79.1 | Flaking | 200.1 | Discontinued |
| 18 | 79.1 | Discontinued | 200.1 | Flaking |
| 19 | 50.5 | Flaking | 115.5 | Discontinued |
| 20 | 50.5 | Discontinued | 115.5 | Flaking |
| 21 | 136.9 | Discontinued | 168.4 | Discontinued |
| 22 | 136.9 | Discontinued | 168.4 | Flaking |
| 23 | 69.9 | Flaking | 28.9 | Discontinued |
| 24 | 69.9 | Discontinued | 28.9 | Flaking |
| 25 | 60.0 | Flaking | 193.4 | Flaking |
| 26 | 60.0 | Discontinued | 193.4 | Discontinued |
| 27 | 57.3 | Flaking | 450.0 | Discontinued |
| 28 | 57.3 | Discontinued | 450.0 | Discontinued |
| 29 | 53.7 | Discontinued | 357.6 | Discontinued |
| 30 | 53.7 | Flaking | 357.6 | Flaking |

Referring to Table 2 and FIG. 18, the life of test specimen 51 can be significantly increased when test specimen 51 has been burnished as compared to when test specimen 51 has not been burnished. Specifically, L10 increases by a factor of 2.2 and L50 increases by a factor of 6.85 when test specimen 51 has been burnished as compared to when test specimen 51 has not been burnished. Note that L10 represents a period of time over which the accumulated failure probability reaches 10%, and L50 represents a period of time over which the accumulated failure probability reaches 50%.

The features described in (each example included in) the embodiment described above may be applied in appropriate combinations within the range where technical inconsistency does not occur.

It should be understood that the embodiments and examples disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 2 tapered roller bearing; 20 outer ring; 20A outer ring raceway surface; 21 inner ring; 21A inner ring raceway surface; 21B surface to be worked; 22 roller; 22A roller rolling surface; 23 cage; 25 burnishing tool; 31 forming roll; 32 fixing roll; 41 non-metallic inclusion; 42 gap; 50 rolling fatigue test machine; 51, 51A, 51B test specimen; 52 steel ball; 53 turntable; 54 cage; 55 rotation shaft; 56 load table; 101 steel material; 102 cutting tool; 103 rolling component formation region; 104 cavity; FF fiber flow.

The invention claimed is:
1. A rolling component comprising a surface, wherein:
the rolling component includes a fiber flow,
the surface has an Ra of 0.1 μm or less, an Rsk<0, and a compressive residual stress of 700 MPa or more, no gap between a non-metallic inclusion present on a side of the surface of the rolling component and a base material forming the rolling component exists, and the surface and the fiber flow form an angle of 15° or more.

2. The rolling component according to claim 1, wherein the rolling component is made of a steel material having an oxygen content of 5 ppm or more.

3. A bearing comprising:

an outer ring;

a rolling element disposed on an inner circumferential surface of the outer ring; and an inner ring disposed at an inner circumferential side of the rolling element, wherein:

at least one of the outer ring, the rolling element or the inner ring is the rolling component according to claim 1, and the surface of the rolling component is one of a raceway surface of the outer ring, a raceway surface of the inner ring, and a rolling surface of the rolling element.

4. A rolling component comprising a surface, wherein:

the rolling component includes a fiber flow, a gap between a non-metallic inclusion present on a side of the surface of the rolling component and a base material forming the rolling component is smaller than a gap between a non-metallic inclusion present on a side of an interior of the rolling component and the base material forming the rolling component, and the surface and the fiber flow form an angle of 15° or more.

5. The rolling component according to claim 4, wherein the rolling component is made of a steel material having an oxygen content of 5 ppm or more.

6. A method of manufacturing a rolling component comprising a surface, the method comprising:

preparing a member comprising a surface to be worked and including a fiber flow;

polishing the surface to be worked; and after the polishing, plastically working the surface to be worked, wherein:

the surface is formed to have an Ra of 0.1 μm or less, an Rsk<0, and a compressive residual stress of 700 MPa or more, and the surface and the fiber flow form an angle of 15° or more.

7. The method of manufacturing a rolling component according to claim 6, wherein burnishing is performed in the plastically working.

8. The method of manufacturing a rolling component according to claim 7, wherein the burnishing is performed by application of a resultant force of a perpendicular force applied in a direction perpendicular to the surface to be worked and a tangential force applied in a direction intersecting the perpendicular force.

9. The method of manufacturing a rolling component according to claim 6, wherein one selected from the group consisting of shot peening, a water jet, and an ultrasonic impact treatment is employed in the plastically working.

10. A method of manufacturing a bearing, the bearing comprising an outer ring, a rolling element disposed on an inner circumferential surface of the outer ring, and an inner ring disposed at an inner circumferential side of the rolling element, at least one of the outer ring, the rolling element and the inner ring being the rolling component manufactured according to claim 6, and the surface of the rolling component being one of a raceway surface of the outer ring, a raceway surface of the inner ring, and a rolling surface of the rolling element.

11. A method of manufacturing a rolling component comprising a surface, the method comprising:

preparing a member comprising a surface to be worked and including a fiber flow;

polishing the surface to be worked; and after the polishing, plastically working the surface to be worked such that a gap between a non-metallic inclusion present on a side of the surface of the rolling component and a base material forming the rolling component is smaller than a gap between a non-metallic inclusion present on a side of an interior of the rolling component and the base material forming the rolling component, and the surface and the fiber flow form an angle of 15° or more.

12. The method of manufacturing a rolling component according to claim 11, wherein burnishing is performed in the plastically working.

* * * * *